United States Patent [19]
Hämäläinen

[11] Patent Number: 5,850,430
[45] Date of Patent: Dec. 15, 1998

[54] METHOD TO IDENTIFY CLIENTS AND METHOD FOR USING A TELETERMINAL DEVICE

[75] Inventor: Antti Hämäläinen, Helsinki, Finland

[73] Assignee: Telecom Finland OY, Helsinki, Finland

[21] Appl. No.: 693,109

[22] PCT Filed: Feb. 14, 1995

[86] PCT No.: PCT/FI95/00064

§ 371 Date: Sep. 4, 1996

§ 102(e) Date: Sep. 4, 1996

[87] PCT Pub. No.: WO95/23473

PCT Pub. Date: Aug. 31, 1995

[30] Foreign Application Priority Data

Feb. 16, 1994 [FI] Finland ..................... 940734

[51] Int. Cl.⁶ .................................. H04M 11/00
[52] U.S. Cl. ..................... 379/93.02; 379/93.09; 379/93.11; 379/93.12; 379/93.25
[58] Field of Search .............. 379/90.01, 92.03, 379/92.04, 93.01, 93.03, 93.11, 93.12, 93.17, 93.24, 93.25, 100.01, 100.14, 100.17, 116, 102.02, 112, 93.02, 127, 93.18, 93.27; 380/23; 382/115; 704/246, 273, 274; 705/1, 7, 35

[56] References Cited

U.S. PATENT DOCUMENTS 5,003,595  3/1991  Collins et al. .
5,181,238  1/1993  Medamana ..................... 379/93.03
5,274,695  12/1993  Green .

FOREIGN PATENT DOCUMENTS 0 451 693 A2  4/1991  European Pat. Off. .
0 451 695 A2  4/1991  European Pat. Off. .
9102637  9/1991  Sweden .

Primary Examiner—Paul Loomis
Assistant Examiner—Melur. Ramakrishnaiah
Attorney, Agent, or Firm—Cohen, Pontani, Lieberman & Pavane

[57] ABSTRACT

A method for enabling a customer, residing at a fixed address, to conduct business transactions with a business service provider using a teleterminal connected to the business service provider's central service center via a telecommunications network, and for verifying whether the customer has rights to conduct the business transactions. The central service center includes a contract database for storing contracts for business transactions that may be conducted by the customer, and an identification database for storing identification data representative of the customer's identity, and customer rights data comprising contract symbols representative of the customer's rights to conduct the business transactions. When the customer wishes to perform a particular business transaction with the business service provider, the central service center automatically generates a corresponding contract for execution by the customer and transmits the contract to the customer, either electronically or by mailing a copy of the contract to the customer's home address. Once the customer executes the contract and returns it to the central service center, the central service center generates a contract symbol representative of the customer's right to conduct the particular business transaction and transmits the contract symbol to the customer. When the customer wishes to conduct the particular business transaction in the future, the customer only needs to present the contract symbol along with some identity verifying information to the central service center in order to be allowed to conduct the contracted-for particular transaction.

9 Claims, 2 Drawing Sheets

METHOD TO IDENTIFY CLIENTS AND METHOD FOR USING A TELETERMINAL DEVICE

The invention relates to the method according to the introductory part of claim 1 for customer identification and the method according to claim 9 for the use of a telephone extension of a stationary wire network or a mobile subscription of a mobil network as a payment and/or business terminal.

In the realization of payment transactions and interactive services intended for plenty of users the identification or verification of a sufficiently well-protected undisputed customer is difficult. Tradionally this problem has been solved so, that customers are called to the customer service point of the organization in question, f.ex. a telephone company, in which their identity is checked and simultaneously protection means—business symbol and passwords, are delivered. This is in practice a troublesome, slow and expensive way to create a wide group of identified customers. The purpose of the invention is to provide an improvement for the above-mentioned disadvantages and enable the use and/or opening of a terminal connection, especially a telephone extension, as a business terminal, whereby the customer is identified and the terminal connection is harnessed as an integral part of the identification process. Characteristic features of the invention are show in the accompanying claims.

By the invention it is strived to avoid unnecessary stay of customers in customer service points. The purpose is to raise the identification reliability and the undisputed nature of the use of services to a high level without compromising the easy utilization of the service. It is essential that the customer can after his or her first contact make business by his own telephone extension and it is not necessary for him in any case to visit the customer service. During the first contact the contract provider identifies the customer, whereby during this contact passwords associated with the activated business symbol will be delivered to the customer. These passwords can alternatively be replaced by voice samples, which are used for individual speaker identification.

Upon the identification an addressed letter dispatch—letter secret—and a connection for a certain address can be linked to each other, so that only a beforehand defined person may join the service from a connection fixed in advance. After activation of the business symbol the customer can use identified closed services from any connection.

The invention will be described in the following with reference to the accompanying drawing, in which.

Figure 1:
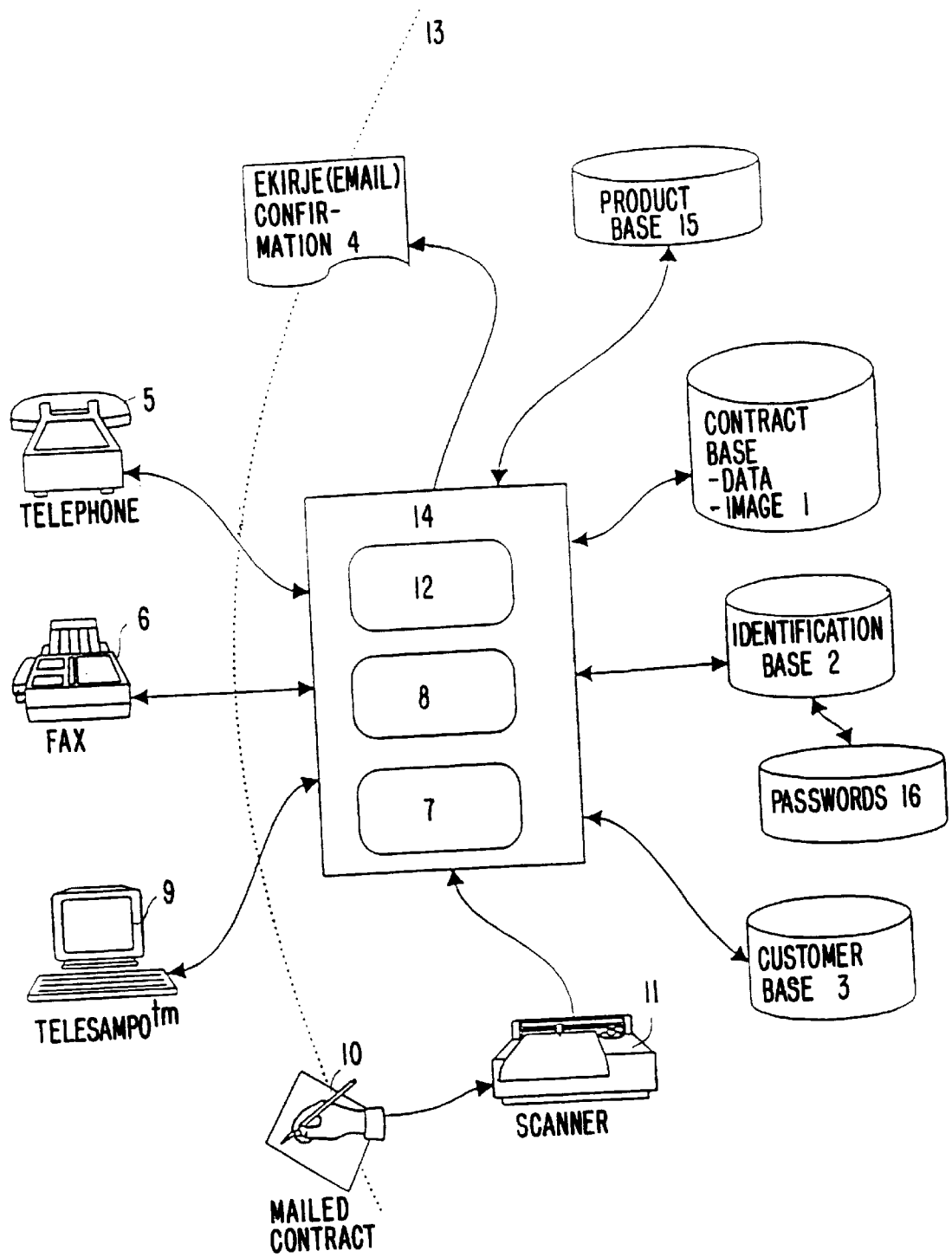
FIG. 1 shows schematically the system according to the invention.

Knowledge bases or registers comprise a contract database 1, in which are kept all the contracts made with the customer both in the data for required for data processing and in the facsimile form required for filing, identification database 2, in which are kept the data needed for the customer identification and verification, as: customer number, business symbol, passwords 16 and/or voice samples needed for the speaker identification as well as data associated with the status of the business symbol, and customer database 3, in which are kept the customer data required for the customer relation from an address data to customer's bank connection and to which can also be connected information concerning persons outside the clientele.

Database registers 1, 2, 3, 15 and 16 are connected by certain computer protocol f.ex. with a network 14, to which have been linked devices utilizing the information in databases and which also can participate in the telecommunications.

These devices include inter alia a telematic service unit 12 that can also give a notice for sending of a confirmation letter for instance by eKirje, which is abbreviation for an electronic letter, or a computerized answering machine. In this machine a computer, available through the telephone network and identifying DTMF—frequency signals and called in the following as Central Voice Applications Platform, gives the answer. The caller or A-subscriber discusses with the voice of VCAP by depressing a selected telephone key proposed by the machine according to a recorded program.

In the system the data is transferred coded as DTMF-signals, which then can be transferred as digital, analog, electric data or as air pressure variations through computer or telephone networks or magnetic media. After the entry of a computer program or a voice message, the computer makes the desired operations according to the user's key-tapping. Corresponding contracts to be sent in written form are received f.ex. to telecopies 8, in which the contract is automatically processed. The telecopy code is converted by the computer software into data form. The mechanical processing in the the telecopies 8 is divided into two parts: filing and identification of automatically readable fields. Also a computer 7 can be used, which is intended for automatic recording of a telecopy dispatch or a facsimile of scanned document in a way known per se, so that it can later be returned to its original output format and mailed or telecopied to the customer, if required, from the contract base register 1 for example based on the connection information received from the clientele register 3.

Computer-readable fields can be Identified by telecopies 8 using a form reserved for this purpose, so that desired sections of the contract document converted into computer language can be identified either as a text, numbers or box marking selections. On the grounds of this information the data varying according to customers and relating to the contract can be registered. This option can be used, when the extension customer mails or otherwise sends the form to the contract provider.

eKirje 4 means an electronic letter, by which the contract situation at any given time is confirmed to the customer, if required, or when the customer makes a contract of new services by telephone or telecopy, he receives automatically by the eKirje a confirmation for the concluded agreement.

The customer can also take care of his contract matters by the terminal 9. The contract can be returned also by post, as is shown by number 10, and it is further processed by the Scanner, an image reading device 11, which converts the contract into a suitable form for computer processing. Thereafter the computer processings corresponding the Telecopy dispatch—filing and identification—can be made for the contract.

Figure 2:
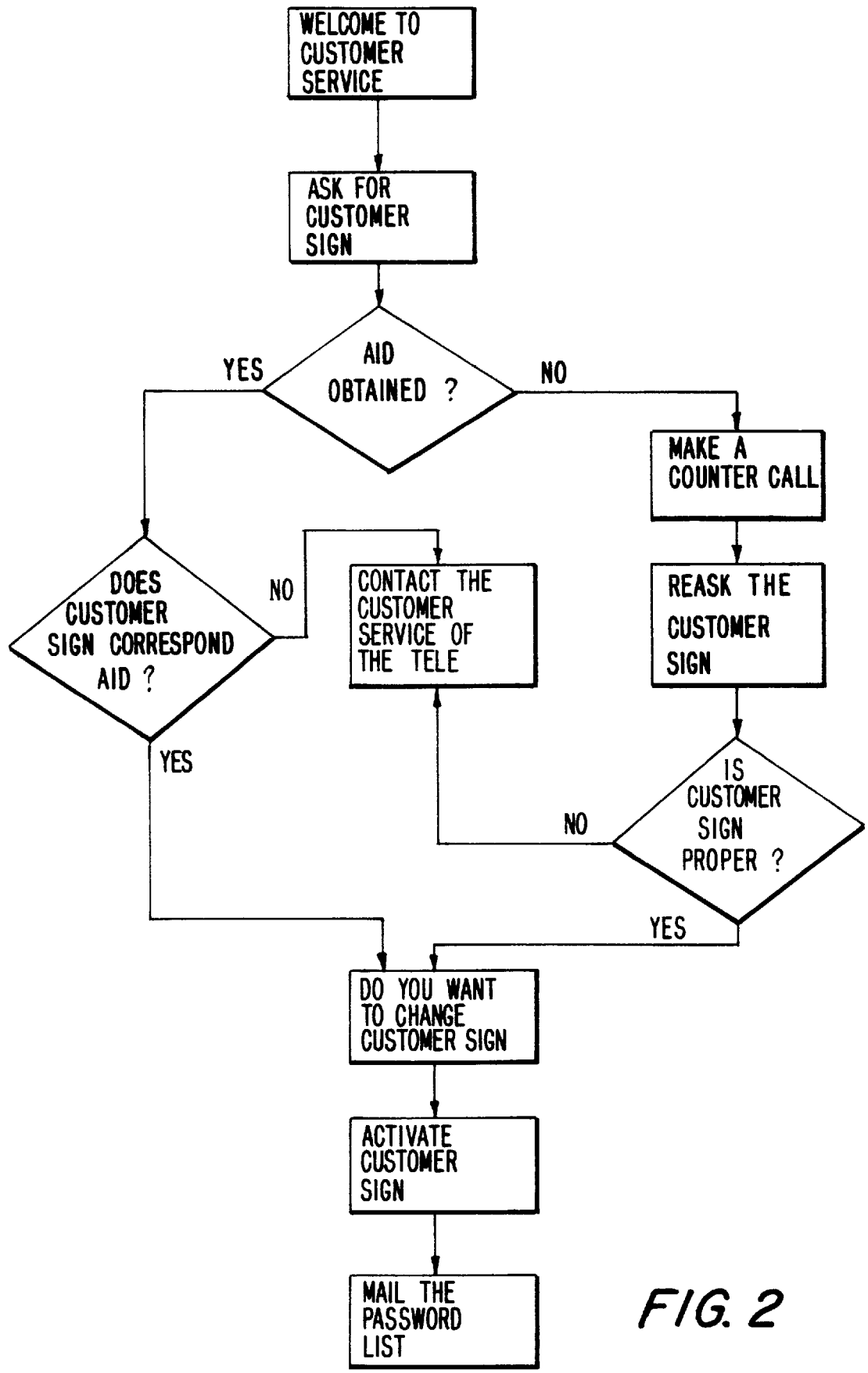
FIG. 2 shows a block diagram of the system.

FIG. 2 shows a block diagram depicting the contract process. When the customer has been notified by a letter of the possibility to take contact to the contract provider, including the information announced by the service provider and concerning the contract format and the customer-related business symbol, which can be f.ex. a computer-created unambiguous business symbol, the customer takes from his own telephone extension 6 contact to the service offered by the contract provider. When the customer calls the voice service computer, the business symbol is asked. Based on this symbol on grounds of the data in the contract base it is checked, whether the customer's business symbol is activated for use. The telephone responder can alternatively be a physical person, who can verify the contract situation from the register in connection through the network.

If the business symbol has not been activated for use, the contact-taking place of the customer is checked. If the AID is received from the common telephone network (digital exchange), it can be compared with the information in the customer and contract base and it can clearly be determined, whether the call comes from the desired extension address. Corresponding identification procedure can also be used, if the terminal device has been connected to another common telenetwork, for instance mobile network, circuit or packet switched datanetwork. If AID is not obtained, the corresponding checking of the extension address can be made by a countercall. By uniting the letter secret and the address of the telephone extension in this way to each other, it can be concluded, that the person who opens the connection, really is mentioned in the customer base.

Finally an opportunity is given to the customer to convert the computer-created business symbol into an individual business symbol the customer has chosen. Thereafter individual passwords associated with the activated business symbol will be mailed to the customer. As an alternative individualizing identification information instead of passwords it is possible to use voice samples to be recorded from the customer in this connection, which will be used together with a speaker identification algorithm in the individual customer identification. After receiving passwords the customer can use different services, whereby the call can be directed to various services, when the code is activated.

A closed service means a service, the use of which requires unambiguous identification of the user.

Business symbol comprises an unambiguous symbol number to be used for individualization of the customer. This number can have varying lengths, e.g. seven characters.

Passwords mean in this connection a predefined group of secret words connected together and to one and only one business symbol. The contract provider has given passwords to the customer, who is properly identified during the contact.

AID (A-number Identification) means signalling service of a digital exchange of the common telephone network or a mobile system, by which the caller can clearly be identified and also the call receiver can unambiguously determine the network address, wherefrom the contact is made.

Countercall means a procedure, in which the call receiver calls back to the defined telephone number and can thus be surer that he is dealing with the desired extension.

Telematic service means a service to be used by a terminal or telephone, in which identification of an actual customer is required. One widely increasing field comprises the settlement of payments, especially fixed and as function of time changing payments to the service provider by the teleterminal device of a stationary telenetwork or mobile network. As an example can be mentioned among other things cinema and/or theater tickets, parking fees etc. Telematic service can be realized computerwise, whereby the customer is in connection by a telephone or a terminal to a data system, which the customer controls by speaking or key-tapping and which guides the customer by spoken or character-formed messages Telematic service can be realized also so, that the actual customer takes contact by telephone to the person in customer service, and in this case this person has at his disposal a data system for identification of the customer. Examples of this include among other things payment transfers from one bank account to another and post and ticket sales.

When the method according to the invention is used by a teleterminal device opened as a business terminal, the A-subscriber takes on the grounds of the business symbol from his teleterminal device contact to the telematic service of the service provider, to whose files have in advance been recorded necessary subscriber data of the A-subscriber, whereby in the telematic service the information included in the business symbol announced by the A-subscriber will be compared with the information in the files of the telematic service provider. When these informations coincide, the service can be used and/or the payment can be delivered further on only after the proper password or other means identifying specifically the A-subscriber, as the voice sample, has been given.

According to the invention in order to use a telephone extension of a stationary wirenet or a teleterminal device of a mobile subscription of a mobile network as a payment or business terminal the caller, i.e. A-subscriber, takes by the teleterminal device contact through the common telephone network to the provider of a contract or a service or product etc. liable to a charge, and the A-subscriber is identified by the A-identity or AID. For the A-subscriber has been in advance determined, preferably with a contract concerning the service, a business or contract symbol, whereby according to a special realization form of the method in compliance with the invention a centralized service center will be used, to which the A-subscriber takes contact by a predetermined selection. In the service center, when the call is coupled on, to the A-subscriber related register in the database of the service center will be recorded the payment and/or business transaction of the A-subscriber. The business or contract symbol will advantageously be used as a questioning key for the payment and/or business transaction by taking contact to the service center, and by the inquiry based on said business or contract symbol information is received in order to identify the A-subscriber and payments or the business transaction.

It is advantageous, that the service center of the telematic service is connected with the intelligent network underlay maintained by the teleoperator, and that the databases of the service center comprise:

contract database 1, in which are kept all the contract made with the customer both in the data form required for data processing and in the facsimile form required for filing.

identification database 2, in which are kept the data needed for the customer identification and verification, as: customer number, business symbol, passwords 16 and/or voice samples needed for the speaker identification as well as the data associated with the status of the business symbol.

customer database 3, in which are kept the customer data required for the customer relation from address data to customer's bank connection and to which can also be connected information concerning persons outside the clientele.

transaction database, in which are recorded in registers relating to business symbols the data about the payment and/or business transactions made by the customers, whereby this data is updated to proper registers on the grounds of the AID-identification made in connection with the call and from which transaction database the customer or a person authorized for the verification of a payment and/or business transaction can, if desired, verify the transaction in question by using the customer's business symbol as a key.

Databases are connected by certain computer protocol with the common telenetwork or a closed private network, to which have been connected devices utilizing the information in databases. These devices can also participate in the telecommunications and they include inter alia a service center of telematic services, having f.ex. a computer identifying DTMF-transmission signals or CVAP, Central Voice Applications Platform, which answers the call of the caller or A-subscriber. The A-subscriber then discusses with CVAP by depressing selectively the telephone keys.

In the system the data is transferred coded for instance as DTMF-signals, which then can be transferred as digital, analog, electric data or as air pressure variations through computer or telephone networks or magnetic media. After the entry is made, the computer protocol performs the operations desired by the A-subscriber and updates the databases. Concerning payment transactions it can be stated that the payments registered into the transaction databases are accounted by the teleoperator directly to the service provider in question and transferred to customer-related invoicing bases maintained by the teleoperator, by which bases payments are charged afterwards from the customer, f.ex. in connection with the telephone invoice.

The invention has been described above only by some preferable opening and operational embodiments of the teleterminal. This of course does not restrict the invention, but various modification and alternatives as well as practical adaptations are possible within the inventive principle defined in the accompanying claims.

I claim:

1. A method for enabling a customer to conduct business transactions with a business service provider using a teleterminal connected to the business service provider's central service center via a telecommunications network, and for verifying whether the customer has rights to conduct the business transactions, comprising the steps of:

(a) providing the central service center with a contract database for storing contract data representative of contracts for business transactions that may be conducted by the customer;

(b) providing the central service center with an identification database for storing, in a customer identification file, identification data containing personal information representative of the customer's identity, and customer rights data comprising contract symbols representative of the customer's rights to conduct business transactions;

(c) providing the central service center with a customer database for storing data necessary for conducting the business transactions between the teleterminal and the central service center;

(d) at the customer's request, automatically generating a contract at the central service center from said contract database, said contract, when executed by the customer, granting the customer a right to conduct a particular business transaction through the central service center;

(e) transmitting said contract from the central service center to the customer;

(f) executing said contract by the customer, so that the customer is granted said right to conduct said particular business transaction through the central service center;

(g) returning, by the customer, said executed contract to the central service center;

(h) storing said executed contract in said contract database;

(i) generating, at the central service center, a particular contract symbol representative of the customer's right to conduct said particular business transaction through the central service center;

(j) storing said particular contract symbol in said identification database;

(k) transmitting said particular contract symbol from the central service center to the customer;

(l) at a time after said step (k), presenting by the customer, from the teleterminal, said particular contract symbol and at least a portion of said identifying data to the central service center to indicate that the customer wishes to initiate said particular business transaction and to provide proof of the customer's identity;

(m) verifying, at the central service center, the customer's identity by comparing said at least a portion of the identifying data presented by the customer at said step (l) to the identifying data stored in said identification database, and verifying the customer's right to conduct said particular business transaction by comparing said particular contract symbol presented by the customer at said step (l) to contract symbols stored in said identification database; and (n) when the customer's identity and right to conduct said particular business transaction are verified at said step (m), enabling, by the central service center, the customer using the teleterminal to conduct said particular business transaction through said central service center in accordance with said customer database.

2. The method of claim 1, wherein the central service center includes a data scanner for scanning and converting printed forms into a data format suitable for storage in an electronic database, wherein said step (d) further comprises the step of generating said contract in a format that facilitates said scanning and converting, and wherein said step (h) further comprises the step of scanning said executed contract by said data scanner and converting said executed contract into said data format for storage in said contract database.

3. The method of claim 1, wherein the customer has a computer terminal for connection to the central service center via the telecommunication network, wherein step (d) further comprises the step of generating said contract in a computer format suitable for transmission through the telecommunication network, wherein said step (e) further comprises the step of electronically transmitting said contract from the central service to the computer terminal, and wherein said step (g) further comprises the step of electronically transmitting said executed contract from the customer's computer terminal to the central service center for storage at said step (h).

4. The method of claim 3, wherein said step (k) further comprises the step of electronically transmitting said particular contract symbol from the central service center to the computer terminal.

5. The method of claim 1, wherein the customer resides at a fixed address, wherein said step (e) further comprises the step of mailing said contract from the central service center to the customer's fixed address, wherein said step (g) further comprises the step of mailing said executed contract by the customer from the customer's fixed address to the central service center, and wherein said step (k) further comprises the step of mailing said particular contract symbol to the customer's fixed address.

6. The method of claim 1, wherein said step (i) further comprises the step of generating a unique password associated with said particular contract symbol, wherein said step (j) further comprises the step of storing the unique password in said customer identification file in said identification database, wherein said step (k) further comprises the step of transmitting said unique password to the customer along with said particular contract symbol, and wherein said at least a portion of the identifying data comprises the unique password.

7. The method of claim 1, wherein the teleterminal is provided with a unique identification number, and wherein said identifying data comprises at least one of the customer's name, the customer's fixed address, and the unique identification number.

8. The method of claim 1, further comprising the step of:
(o) selecting, by the customer, a unique business symbol for replacing said particular contract symbol;
(p) transmitting, by the customer to the central processing center, said unique business symbol; and
(q) replacing said particular contract symbol in said identification database with said unique business symbol, so that, at a later time, the customer may present said unique business symbol instead of said particular contract symbol to the central service center to demonstrate the customer's right to conduct a particular business transaction.

9. The method of claim 1, further comprising the steps of:
(r) providing the central service center with a transaction database for storing records of the business transactions conducted by the customer through the central service center;
(s) generating a transaction record of said particular business transaction conducted at said step (n); and
(t) storing said transaction record in said transaction database.

* * * * *